E. J. LOBDELL.
REINFORCED WOOD RIM.
APPLICATION FILED FEB. 8, 1909.
964,984.
Patented July 19, 1910.
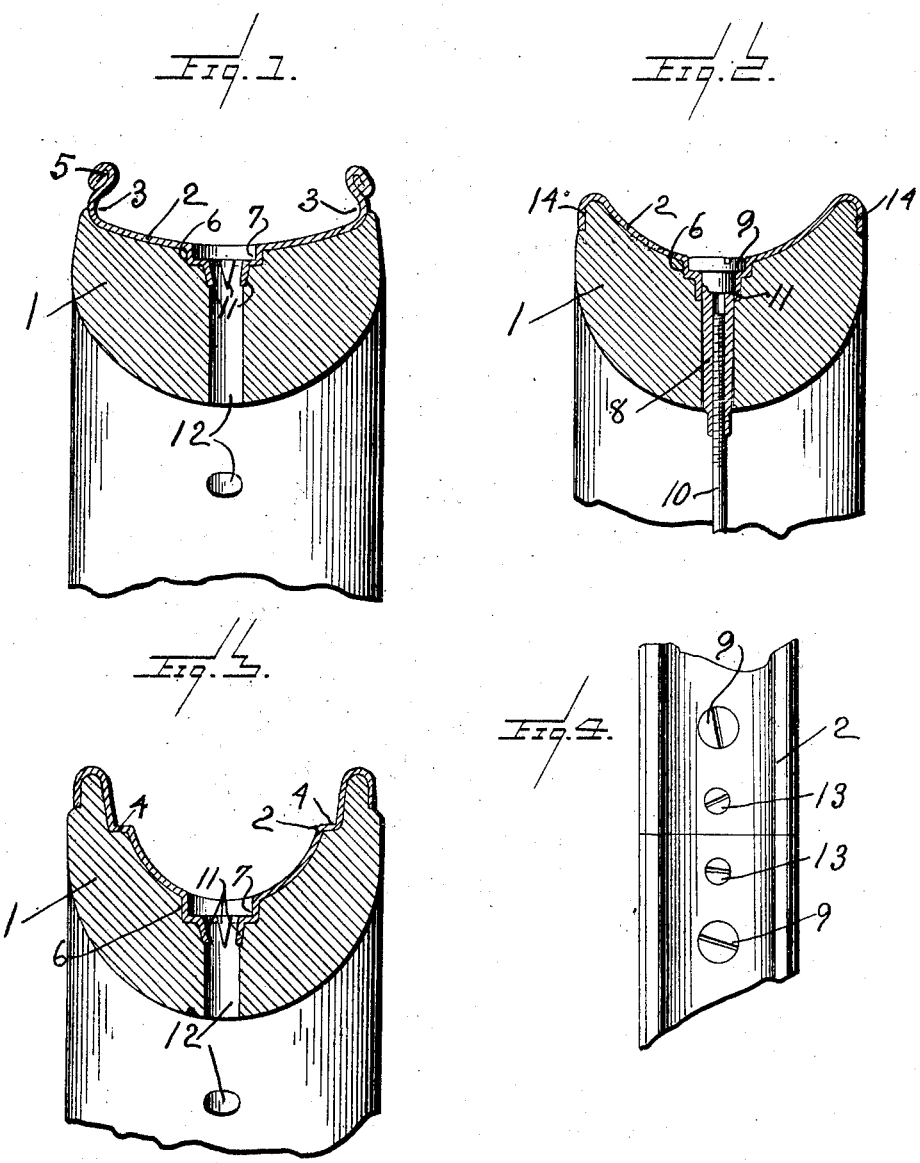
WITNESSES
INVENTOR
Edward J. Lobdell
BY
Attorney

UNITED STATES PATENT OFFICE.

EDWARD J. LOBDELL, OF ONAWAY, MICHIGAN.

REINFORCED WOOD RIM.

964,984.  Specification of Letters Patent.  Patented July 19, 1910.

Application filed February 8, 1909. Serial No. 476,831.

*To all whom it may concern:*

Be it known that I, EDWARD J. LOBDELL, a citizen of the United States, residing at Onaway, in the county of Presque Isle, State of Michigan, have invented certain new and useful Improvements in Reinforced Wood Rims, of which the following is a description, reference being had to the accompanying drawings, forming a part hereof.

My invention relates to metal reinforced wood rims designed for use in wheels for bicycles, sulkies, and other light vehicles wherein maximum strength and resilience with a minimum weight of material are features of importance, and which wheels are commonly provided with pneumatic or other types of resilient tires; and the general objects of my invention are to provide a metal reinforced wood rim wherein the metal reinforcing member is more securely attached to the wood rim and a stronger and more efficient rim thereby procured, and to provide a rim in which injury to the resilient tire commonly used with such rims is avoided.

In such types of metal reinforced wood rims as have been commonly and extensively used the outer or head ends of the nipples to which the outer ends of the spokes of the wheel are secured have usually projected beyond the surface of the metal reinforcing member, thus coming into direct contact with the tire which rests upon said reinforcing member which feature, especially in case pneumatic tires are used which is the more common practice, has frequently resulted in injury to the tire; and one of the objects of my invention is to provide a metal reinforced rim in which such projections are avoided and the liability of the tire to injury by them thus eliminated, and a rim in which at the same time the features whereby such projections are avoided assist in securing the metal reinforcing member to the wood rim and in securing a stronger and a more effective rim of the type specified.

With the above enumerated objects in view my invention consists in the improved metal reinforced wood rim illustrated in the accompanying drawing, described in the following specification, and particularly claimed in the clauses of the concluding claim.

In the drawing, Figure 1 is a view show- ing a transverse section of my improved rim as adapted for tires commonly referred to as of the clencher type; Fig. 2 is a view showing a transverse section of my improved rim as adapted for single tube tires, this view showing also the end of a spoke and the nipple wherein it is secured; Fig. 3 is a view showing a transverse section of my improved rim as adapted for tires having wired edges, and Fig. 4 is a view show- ing a plan of a portion of my improved tire and illustrating the manner in which the ends of the metallic reinforcing member are secured to the wood rim.

In the drawing, 1 is a wood rim which may be formed from a single piece of wood, or may be formed by gluing together a number of thin strips, both methods of construction being common in the art.

2 is a metallic reinforcing member which surrounds the wood rim 1 and is secured to the periphery thereof, and upon which the resilient tire rests. This reinforcing member is given various forms to adapt the wheel to particular types of tires; the edges thereof being inclining inward as shown in Fig. 1 to form recesses 3 for receiving the enlarged lower edges of clencher tires, or provided with offsets 4, Fig. 3, for receiving the wired edges of the other types of tires, or the reinforcing member may be of simple concave form as shown in Fig. 2 if the wheel is to be provided with a single tube tire.

In the form shown in Fig. 1 the edges of the reinforcing member are bent upon themselves and rolled outward to thereby provide a plurality of thicknesses of material as shown at 5 whereby the edges are materially strengthened and a rim procured in which liability of the tire to injury by abrasion or cutting by the reinforcing member is materially lessened both by the presence of the enlarged annular ridges thus formed and the fact that the metal is rolled outward whereby the surface of the reinforcing member with which the tire contacts is smooth and continuous throughout its entire extent.

The wood rim 1 is provided with a plurality of passages 12, one for each of the nipples and spokes with which the wheel is provided, and the outer surface of the rim is provided with a like number of recesses communicating with the outer ends of the said passages, one of which recesses is shown at 6. The metallic reinforcing member 2 is provided with a corresponding number of recesses 7 within which the outer or head ends of the nipples wherein the ends of the spokes are secured rest, 8 being one of such nipples having a head 9, and 10 being the end of a spoke. It will thus be seen that the heads of the nipples are countersunk and lie below the surface of the reinforcing member, whereby a smooth and even surface is presented to the resilient tire and injury thereof by the heads of the nipples thus avoided. The bottom wall of the recess 7 is provided with depending spurs 11 which lie within the upper ends of the passages 12 provided for the nipples, which spurs serve as additional means for securing an effective bond between the wood rim and the metallic reinforcing member.

The preferred method of constructing the rim above disclosed is to form the recess 6 in the wood rim 1 and place the metallic reinforcing member 2 thereon with its free ends secured to the rim by screws 13 as shown in Fig. 4, the recesses 7 being not yet formed in the reinforcing member 2. The material of the reinforcing member is then forced into the recesses 6 of the wood rim by punching spinning or other mechanical process to form the recesses 7, and the bottom of the recess thus formed is forced by a continuation of the same or by an equivalent process into the upper ends of the passages 12 to thereby form the spurs 11.

The method above outlined will result in a firm bond between the wooden rim and the metallic reinforcing member as it will be obvious that the sides and bottoms of the recesses 7 will be forced into intimate contact with the recesses 6 in the wood rim and the spurs 11 will be forced into contact with and to a greater or less degree into the material at the upper end of the passages 12, whereby a more firm bond will be secured between the wood rim and the metallic reinforcing member and a stronger and more effective rim thereby procured.

The periphery of the wood rim 1 is rabbeted as at 14 in the form of rim shown in Figs. 2 and 3 which rabbets are designed to receive the outwardly and downwardly extending edge of the metallic reinforcing member 2, the purpose of this feature being to prevent the reinforcing member from being torn from the wooden rim or otherwise injured in handling or in use, it being seen that the wooden rim extends slightly beyond the surface of the downwardly extending portion of the metal reinforcing member so that said edge will not catch upon obstructions.

It will be seen from Fig. 4 that the ends of the metallic reinforcing member 2 are secured to the wood rim 1, in which feature my improved rim differs from those types of rims wherein the metallic reinforcing member is continuous; and it is found in practice that a more resilient rim, as compared with rims having continuous reinforcing bands, is thereby procured.

The metallic reinforcing member 2 may be made of any metal capable of being worked to give it the form disclosed, and I have used both aluminum and steel with satisfactory results.

Having thus described my invention and explained the mode of operation thereof, I claim and desire to secure by Letters Patent:

1. In a metal reinforced wood rim for vehicle wheels, a wood rim provided with a plurality of passages adapted to receive nipples, and with recesses communicating with the outer ends of said passages; and a metal reinforcing member surrounding said rim and adapted to receive a resilient tire, and provided with a corresponding number of recesses disposed within the recesses of said wood rim, and with spurs projecting from the bottom walls of said recesses and into the upper ends of said passages.

2. In a metal reinforced wood rim for vehicle wheels, a wood rim provided with a plurality of passages adapted to receive nipples, and with recesses communicating with the outer ends of said passages; and a metal reinforcing member surrounding said rim and adapted to receive a resilient tire, and provided with a corresponding number of recesses disposed within the recesses of said wood rim and in intimate contact with the walls thereof, and with spurs projecting from the bottom walls of said recesses and into the upper ends of said passages.

3. In a metal reinforced wood rim for vehicle wheels, a wood rim provided with a plurality of passages adapted to receive nipples, and with recesses communicating with the outer ends of said passages; and a metal reinforcing member surrounding said rim and adapted to receive a resilient tire, and provided with a corresponding number of recesses disposed within the recesses of said wood rim, and with spurs projecting from the bottom walls of said recesses and into the upper ends of said passages, the edges of said reinforcing member which secure the tire in place being folded outward to thereby provide a plurality of thicknesses of material and a continuous and smooth surface for a tire to rest upon.

4. In a metal reinforced wood rim for vehicle wheels, a wood rim provided with a plurality of passages adapted to receive nipples, and with recesses communicating with the outer ends of said passages, and provided also with a rabbet upon either side of the periphery thereof; and a metal reinforcing member surrounding said rim and adapted to receive a resilient tire, the edges of said reinforcing member being bent outwardly and downwardly so as to lie within the rabbets aforesaid, said reinforcing member being provided with recesses corresponding in number with the recesses in said wood rim and disposed within said recesses, and with spurs projecting from the bottom walls of said recesses and into the upper ends of said passages.

This specification signed and witnessed this 6th day of February A. D. 1909.

EDWARD J. LOBDELL.

In the presence of—
 F. H. MUELLERWEISS,
 M. CRUSE.